United States Patent
Schultheiss et al.

(10) Patent No.: US 6,669,761 B2
(45) Date of Patent: Dec. 30, 2003

(54) AIR FILTER HAVING ELECTROSTATICALLY ACTIVE NONWOVEN FABRIC INLINERS AND THEIR USE

(75) Inventors: Wolfram Schultheiss, Weinheim (DE); Armin Greiner, Weinheim (DE); Silke Frank, Mannheim (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 10/131,003

(22) Filed: Apr. 24, 2002

(65) Prior Publication Data

US 2003/0000389 A1 Jan. 2, 2003

(30) Foreign Application Priority Data

Apr. 24, 2001 (DE) .......................... 101 20 223

(51) Int. Cl.[7] .............................................. B03C 3/155
(52) U.S. Cl. ............................... 96/66; 15/347; 15/352; 55/382; 55/486; 55/DIG. 2; 55/DIG. 39; 96/69
(58) Field of Search ............................... 96/15, 65, 66, 96/69; 95/57, 78, 286, 287; 55/486, 487, 382, 485, 528, DIG. 2, DIG. 3, DIG. 5, DIG. 39; 15/347, 352; 264/DIG. 48

(56) References Cited

U.S. PATENT DOCUMENTS

| | | | | |
|---|---|---|---|---|
| 3,998,916 A | | 12/1976 | van Turnhout | 264/DIG. 48 |
| 4,798,850 A | * | 1/1989 | Brown | 521/134 |
| 5,013,502 A | * | 5/1991 | Reinehr et al. | 264/103 |
| 5,230,800 A | * | 7/1993 | Nelson | 210/496 |
| 5,419,953 A | * | 5/1995 | Chapman | 442/35 |
| 5,470,485 A | * | 11/1995 | Morweiser et al. | 210/748 |
| 5,620,785 A | * | 4/1997 | Watt et al. | 428/219 |
| 5,792,242 A | * | 8/1998 | Haskett | 96/68 |
| 5,898,981 A | * | 5/1999 | Legare | 28/111 |
| 6,056,809 A | * | 5/2000 | Chapman | 96/67 |
| 6,171,369 B1 | * | 1/2001 | Schultink et al. | 95/57 |
| 6,183,536 B1 | * | 2/2001 | Schultink et al. | 95/57 |
| 6,372,004 B1 | * | 4/2002 | Schultink et al. | 55/382 |
| 6,395,046 B1 | * | 5/2002 | Emig et al. | 55/382 |
| 6,428,610 B1 | * | 8/2002 | Tsai et al. | 96/15 |

FOREIGN PATENT DOCUMENTS

| | | |
|---|---|---|
| DE | 38 12 849 | 10/1989 |
| DE | 44 07 344 | 5/1995 |
| DE | 197 31 860 | 1/1999 |
| EP | 0 161 790 | 11/1985 |
| EP | 0 246 811 | 11/1987 |
| EP | 0 338 479 | 10/1989 |
| EP | 0 674 933 | 10/1995 |
| EP | 0 960 645 | 12/1999 |

* cited by examiner

*Primary Examiner*—Richard L. Chiesa
(74) *Attorney, Agent, or Firm*—Kenyon & Kenyon

(57) ABSTRACT

A multi-layer air filter is described, including a filter layer which is covered by a prefilter layer on the dust-laden gas side, which has a laid dry electrostatically effective nonwoven fabric, preferably a staple fiber nonwoven fabric, whose area weight is 10 through 100 g/m². In particular, the filter may be used as a vacuum cleaner bag.

19 Claims, 1 Drawing Sheet

AIR FILTER HAVING ELECTROSTATICALLY ACTIVE NONWOVEN FABRIC INLINERS AND THEIR USE

BACKGROUND INFORMATION

1. Field of the Invention

The invention relates to filter materials having improved filtration properties, which find application especially in vacuum cleaner bags.

2. Description of Related Art

The use of filter bags in vacuum cleaners is generally known. For such applications, the bags must satisfy a plurality of requirements, which in part are oppositely directed. Besides a high degree of dust separation, for coarse as well as fine dust, there are requirements for low air resistance, a low tendency to clog, as well as for mechanical stability.

A general problem with vacuum cleaner bags is their tendency to clog, when compact materials having mechanical filtration properties are used, such as paper or fine fiber spunbonded materials without voluminous build-up. To be sure, this compact build-up contributes to improving the dust barrier properties of a filter bag, but it makes the bag susceptible to fine dust, which penetrates these compact filter media and clogs them. Parameters such as suction efficiency stability and separation performance of a filter bag, such as a vacuum cleaner bag, tend to be compromises. This means that, in the case of improvement of suction efficiency stability, the separation performance of a vacuum cleaner bag can usually not be decisively improved.

Filter bags based on paper/melt-blown are described, for example, in DE-C-197 31 860 or EP-A-0 338 479; filter bags based on spunbond/melt-blown are known from EP-A-0 161 790.

From EP-A-0 960 645 inliner layers in a coarse filter embodiment are known, which protect the following, actual filtration layer from clogging by coarse dust. The vacuum bags described in this document are made of several layers which have one coarse filter layer made of various materials placed ahead of them, in order to raise the service life of the bag. In this connection, layers made of special papers and special non-wovens are combined with one another. The use of electrostatically chargeable or loaded fibers, for example, made of propylene fibers, in selected paper layers or layers of non-wovens is described.

From EP-A-0 246811 filter materials are known which are made of mixtures of polypropylene fibers and modacrylic (modified acrylic) fibers. Nonwoven materials made of these fiber mixtures can be used as vacuum cleaner bags. These fiber mixtures may be used especially well for filtration of fine dusts, on account of their strong electrostatic properties.

EP-A-0 674 933 describes the production of an air filter material having electrostatic effectiveness, which includes the production of a needle-punched card web made of selected fibers.

Starting from this related art, the present invention makes available an air filter material whose total separation performance (separation performance for coarse and fine dusts), as compared to the usual air filter materials, was significantly improved, without thereby substantially worsening the clogging tendency, as a matter of fact even improving it. The air filters according to the present invention are thus distinguished by improved overall separation performance, in comparison to known materials.

SUMMARY OF THE INVENTION

The present invention relates to a multi-layer air filter including a filter layer, preferably a filter layer containing a synthetic fiber, and a prefilter layer covering it on the dust-laden side, the prefilter layer having a laid dry and electrostatically effective nonwoven material, preferably a staple fiber nonwoven fabric, whose mass per unit area is 10 to 100 g/m$^2$.

DETAILED DESCRIPTION OF THE INVENTION

Figure 1:
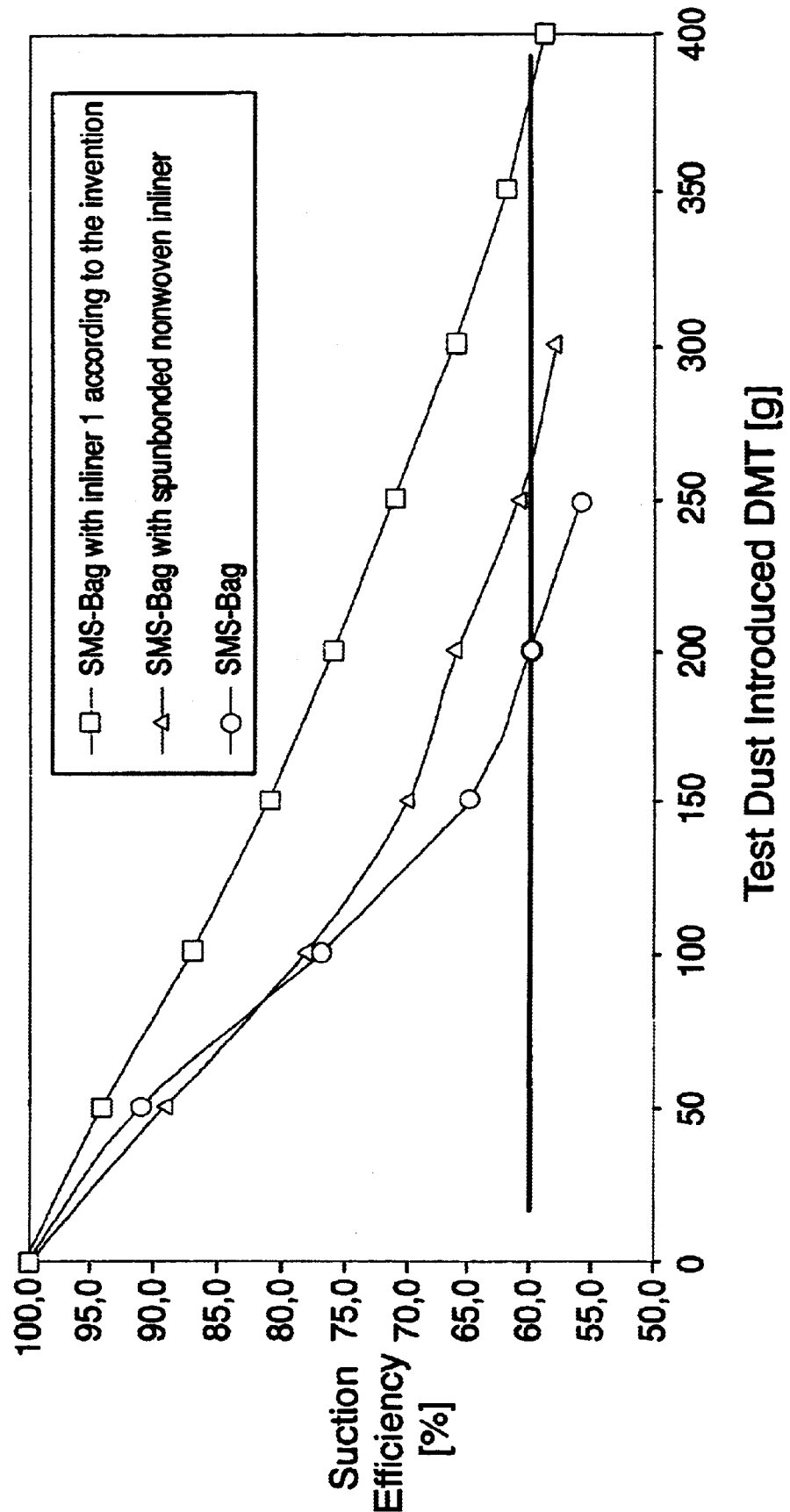
FIG. 1 is a graph of suction efficency verses grams of test dust introduced.

In the filter layer used according to the present invention, a usual filter material may be involved. Examples thereof are paper, or combinations of paper with melt-blown nonwoven fabric or combinations of spunbonded nonwoven material with melt-blown nonwoven, as are already being used in vacuum cleaner bags. Such usual filter materials are, for instance, melt-blown combinations as in EP-A-0 161 790, paper/melt-blown combinations as in EP-A-0 338 479 or as in DE-C-197 31 860, but also pure paper filter media.

The filter layer is quite especially preferably made of a spunbonded/melt-blown/spunbonded laminate.

According to the present invention, a highly efficient filter layer made of nonwoven fabric having a strong electrostatic charge is put ahead of these filter layers for the simultaneous increase of the suction efficiency stability and the separation performance. This can be done by loosely laying the prefilter layer into the filter bag or by including it in the structure of appropriate filter material laminates.

The filter layer (inliner) used according to the present invention is able to protect effectively the subsequent filter layer(s), which have geometrically finer pores, from fine dust and the clogging associated with it, by their strong electrostatic filtration properties, which may be quantified by the separation performance in comparison with that for cooking salt powder.

The function of a vacuum cleaner bag furnished with the above-mentioned filter layer lies, thus, in the combination of a relatively voluminous, electrostatically charged filter layer made of nonwoven fabric with a subsequent mechanically well filtering, more compact filter layer, which, as a rule, has finer pore radii and fiber titers.

It is especially preferred to use a laid dry staple fiber nonwoven fabric made of triboelectric fiber mixtures as the laid dry electrostatically effective nonwoven fabric, particularly if it is made of polypropylene/polyethylene bicomponent fibers and of halogen-free polyacrilonitrile fibers. Such fiber mixtures are described in DE-A-4,407,344.

Further preferred prefilters used are laid dry staple fiber nonwoven fabrics made of corona-charged polyolefin fibers, especially corona-charged polypropylene fibers.

Further preferably used prefilters are laid dry nonwoven fabrics made of corona-charged polypropylene split fibers. Examples of this are described in U.S. Pat. No. 3,998,916.

The air filters according to the present invention preferably include a laid dry staple fiber nonwoven fabric having a permeability to air of more than, or equal to 700 l/(m$^2$*sec), preferably greater than 1000 l/(m2*sec), at a differential pressure of 200 Pa, an NaCl permeability $D_{NaCl}$ of less than 40%, preferably less than 30%, and a differential pressure of less than, or equal to 20 Pa.

The fibers of the prefilter layer are preferably staple fibers. It is especially preferred if the prefilter layer is produced from staple fibers having a titer <10 dtex. The length of the staples is preferably 3 through 10 cm.

In an especially preferred manner the prefilter layer is made of staple fibers having a titer of 0.5 through 5 dtex and having an area weight of 30 through 60 g/m$^2$.

The filter layer and the prefilter layer may be joined without a connection by simply laying the prefilter into the filter bag, or they may be joined together in any way desired, such as by mechanical connections, such as by needle-punching, sewing or quilting, or by physical connections such as bonding or heat sealing. It is also possible to connect these layers to one another via further intermediate layers, but the air permeability of these layers has to be ensured.

Preferably, the prefilter layer is directly connected to the filter layer.

In a further preferred embodiment, on the dust-laden side of the prefilter layer, a further nonwoven material and/or paper layer is positioned, which protects the subsequent layers from mechanical damage or is used as a processing aid.

The inliners installed according to the present invention stand out by comparable or lower degrees of permeability ($D_{NaCl}$) or comparable or higher separation performance for NaCl ($As_{NaCl}=100-D_{NaCl}$) as compared to fine aerosol, at simultaneously at least double, preferably four-fold air permeability in comparison to the total of the subsequent filter layer(s). The quotient of air permeability (at 200 Pa in l/m$^2$s) and degree of permeability ($D_{NaCl}$ in %) is usually greater than 120 with the materials used according to the present invention, at a simultaneous pressure loss of at most 20 Pa and area weights between 10 and 100 g/m$^2$.

The air filters according to the present invention can become used for any filtration purpose desired, preferably as vacuum cleaner bags.

The following examples describe the present invention without limiting it.

EXAMPLES

Description of the Tested Products

Customary vacuum cleaner bags were tested on the basis of SMS, of the type described in EP-A-0 161790.

As the SMS composite, 40 g spunbond on the basis of polypropylene fibers, 30 g melt-blown and 15 g spunbond on the basis of polypropylene fibers were applied.

The spunbond nonwoven fabric inliner of the investigated SMS bag was made of 30 g polypropylene fibers.

Inliner 1 and inliner 2 were made of polypropylene fibers having titers of 3.3 dtex and 1.7 d tex respectively.

Test Methods

Air Permeability

Ascertained according to DIN 53 887, measured at 200 Pa (area 20 cm$^2$).

Degree of permeability to sodium chloride and pressure difference.

The degree of permeability to sodium chloride was ascertained using equipment "TSI Certitest Model 8130". As aerosol generator, TSI Model 8118 was used for the cooking salt, and it generates sodium chloride particles having an average diameter of 0.26 μm (mass). Measurements were taken at a filtration speed of 0.08 m/s. The degree of permeability—NaCl is the measure of the passage of the sodium chloride aerosol not separated by the filter medium. The pressure difference expressed in pascals (Pa) is the static pressure drop over the filter medium with respect to the volume flow of 0.08 m/s.

Results

The table below shows as examples the technical values for the filter layers used according to the present invention and their effect on filter bags.

TABLE 1

Degree of permeability and pressure loss of inliners as well as of a typical SMS (spunbond/melt-blown/spunbond) bag material with or without inliner.

| Product | Degree of $D_{NaCl}$ (%) | Pressure Loss (Pa) | Air Permeability at 200 Pa (l/m$^2$s) |
|---|---|---|---|
| Inliner 1 (50 g/m$^2$; 3.3 dtex) | 27 | 3.0 | 3300 |
| Inliner 2 (50 g/m$^2$; 1.7 dtex) | 9.2 | 7.4 | 2000 |
| SMS filter bag material without inliner | 30 | 50 | 350 |
| SMS filter bag material with inliner 1 | 10 | 53 | 340 |

As an application example, the pattern of improvement in the suction efficiency stability of a typical SMS filter bag is shown. The results are shown in the illustration below.

FIG. 1 illustrates the suction efficiency stability of filter bags made of SMS material having inliner 1 according to the present invention, compared to the same SMS filter bag material having a customary spunbonded nonwoven as inliner, and without inliner.

Inliner 1 according to the present invention, in this application example, leads to almost a doubling of the corresponding dust storage capability (at 60% suction efficiency, 380 g dust as compared to 200 g dust) and thereby to a considerable extension of the service life of a filter bag thus equipped. With respect to the improvements afforded by customary inliner materials such a spunbonded nonwoven fabrics or porous paper, the materials according to the present invention clearly stand out. In addition, separation performance with regard to fine dust of the entire bag laminate is greatly improved by the use of inliner 1.

What is claimed is:

1. A multi-layer air filter comprising a filter layer and a prefilter layer covering it on a dust-laden side thereof, the prefilter layer having a dry-laid and electrostatically effective nonwoven fabric, whose mass per unit area is from 10 to 100 g/m$^2$ and an NaCl degree of permeability $D_{NaCl}$ of less than or equal to 40%.

2. The air filter according to claim 1, wherein the prefilter layer is a dry-laid staple fiber nonwoven fabric.

3. The air filter according to claim 1, wherein the filter layer is made of paper, or of a combination of paper and melt-blown nonwoven fabric or of a combination of spunbonded nonwoven and melt-blown nonwoven fabric.

4. The air filter according to claim 1, wherein the filter layer is made of a spunbond/melt-blown/spunbond laminate.

5. The air filter according to claim 1, wherein the dry-laid electro-statically effective nonwoven fabric is a dry-laid staple fiber nonwoven fabric made of corona-charged polyolefin fibers.

6. The air filter according to claim 5, wherein the corona-charged polyolefin fibers are polypropylene fibers.

7. The air filter according to claim 1, wherein the dry-laid electro-statically effective nonwoven fabric is a dry-laid staple fiber nonwoven fabric made of a triboelectric fiber mixture.

8. The air filter according to claim 7, wherein the mixture is of polypropylene/polyethylene bicomponent fibers or of halogen-free polyacrylonitrile fibers.

9. The air filter according to claim 1, wherein the dry-laid electro-statically effective nonwoven fabric is a laid dry nonwoven fabric made of corona-charged polypropylene split fibers.

10. The air filter according to claim 1, wherein the dry-laid electro-statically effective staple fiber nonwoven fabric has an air permeability of greater than or equal to 700 $l/(m^2 \ast sec)$ at a pressure difference of 200 Pa, the NaCl degree of permeability $D_{NaCl}$ of less than or equal to 40% and a differential pressure of less than or equal to 20 Pa.

11. The air filter according to claim 10, wherein the dry-laid electrostatically effective staple fiber nonwoven fabric has an air permeability of greater than or equal to 1000 $l/(m^2 \ast sec)$ at a pressure difference of 200 Pa, the NaCl degree of permeability $D_{NaCl}$ of less than or equal to 30% and a differential pressure of less than or equal to 20 Pa.

12. The air filter according to claim 10, wherein the quotient of the air permeability in $l/(m^2 \ast sec)$ and the NaCl degree of permeability $D_{NaCl}$ in % is greater than or equal to a value of 120.

13. The air filter according to claim 11, wherein the quotient of the air permeability in $l/(m^2 \ast sec)$ and the NaCl degree of permeability $D_{NaCl}$ in % is greater than or equal to a value of 120.

14. The air filter according to claim 1, wherein the prefilter layer is produced from staple fibers having a titer of <10 dtex.

15. The air filter according to claim 14, wherein the prefilter layer is made of staple fibers having a titer of 0.5 through 5 dtex and has a mass per unit area of from 30 to 60 $g/m^2$.

16. The air filter according to claim 1, wherein the filter layer has an air permeability of less than or equal to 500 $l/(m^2 \ast sec)$ at a differential pressure of 200 Pa.

17. The air filter according to claim 1, wherein the prefilter layer is directly connected to the filter layer.

18. The air filter according to claim 1, wherein on the dust-laden side of the prefilter layer, a further nonwoven fabric layer or a paper layer is positioned, which protects subsequent layers from mechanical damage or is used as a processing aid.

19. A vacuum cleaner bag comprising the air filter according to claim 1.

* * * * *

UNITED STATES PATENT AND TRADEMARK OFFICE
CERTIFICATE OF CORRECTION

PATENT NO. : 6,669,761 B2
DATED : December 30, 2003
INVENTOR(S) : Schultheiss et al.

It is certified that error appears in the above-identified patent and that said Letters Patent is hereby corrected as shown below:

Column 2,
Line 5, change "laid dry" to -- dry-laid --; (both occurrences)
Lines 48, 50, 54 and 62, change "laid dry" to -- dry-laid --;

Column 3,
Lines 59-60, change "was used for the cooking salt," to -- was used --;

Column 5,
Lines 5 and 8, change "electro-statically" to -- electrostatically --.
Line 11, change "the NaCl" to -- an NaCl --.

Signed and Sealed this

Twenty-first Day of June, 2005

JON W. DUDAS
*Director of the United States Patent and Trademark Office*